(12) United States Patent
Ellis et al.

(10) Patent No.: US 8,379,215 B2
(45) Date of Patent: Feb. 19, 2013

(54) ROTARYFROG SYSTEMS AND METHODS

(75) Inventors: Armin T. Ellis, La Canada Flintridge, CA (US); Ulf Osterberg, Trondheim (NO)

(73) Assignee: The Trustees of Dartmouth College, Hanover, NH (US)

( * ) Notice: Subject to any disclaimer, the term of this patent is extended or adjusted under 35 U.S.C. 154(b) by 178 days.

(21) Appl. No.: 12/904,936

(22) Filed: Oct. 14, 2010

(65) Prior Publication Data

US 2011/0149281 A1   Jun. 23, 2011

Related U.S. Application Data

(63) Continuation-in-part of application No. PCT/US2009/040582, filed on Apr. 14, 2009.

(60) Provisional application No. 61/044,757, filed on Apr. 14, 2008.

(51) Int. Cl.
*G01B 9/02* (2006.01)
(52) U.S. Cl. ...................................................... 356/450
(58) Field of Classification Search .................. 356/450, 356/452, 453, 451
See application file for complete search history.

(56) References Cited

U.S. PATENT DOCUMENTS 5,852,620 A * 12/1998 Wan ................................ 372/22
6,611,336 B1    8/2003 Walmsley et al.
7,570,851 B2 *  8/2009 Weiner ............................ 385/36

OTHER PUBLICATIONS

Walecki et al., Characterization of the polarization state of weak ultrashort coherent signals by dual-channel spectral interferometry, Jan. 15, 1997, Optics Letters, vol. 22, No. 2, pp. 81-83.*
Thomson et al., Complete pulse characterization at 1.5um by cross-phase modulation in optical fibers, Oct. 15, 1998, Optics Letters, vol. 23, No. 20, pp. 1582-1584.*
O'Shea et al., Increased-bandwidth in ultrashort-pulse measurement using an angle-dithered nonlinear-optical crystal, Nov. 6, 2000, vol. 7, No. 10, pp. 342-349.*
Cao, Q. et al. "Measurement of the Intensity and Phase of Supercontinuum form an 8-mm-long Mircrostructure Fiber" Applied Physics B (Laser & Optics) Springer-Verlag Germany, vol. B77, No. 2-3, Sep. 2003, pp. 239-244.
Ellis, et al "Rotary FROG: Geometry for Measuring Amplitude & Phase of Weak Broadband Laser Pulses" Optics Letters, Feb. 15, 2009, pp. 404-406.
Wasilewski, et al "Femtosecond Laser Pulses Measured with a Photodiode—FROG Revisited" Applied Physics B: Lasers & Optics, Mar. 2004, vol. 78, No. 5, pp. 589-592.
International Search Report and Written Opinion issued in related PCT Patent Application Serial No. PCT/US2009/040582, Nov. 30, 2009.

* cited by examiner

*Primary Examiner* — Gregory J Toatley
*Assistant Examiner* — Shawn Decenzo
(74) *Attorney, Agent, or Firm* — Lathrop & Gage LLP

(57) ABSTRACT

Systems and methods determining amplitude and phase versus frequency of an incoming beam of pulsed laser light. The incoming beam is split into two beams of substantially equal intensity, one of which is delayed for a delay period t. The two split beams are recombined to shine onto a thick SHG crystal at rotation angle $\theta$ and light emitted from the thick SHG crystal is detected as data and stored with reference to the delay period t and the angle $\theta$. The thick SHG crystal is rotated by an angle $\delta\theta$, and light is detected as data and stored until the thick SHG crystal has completed 360° of rotation. This is repeated for $\delta t$ increases in the delay period until a selected beam delay period range has been completed. The stored data is processed to determine amplitude and phase versus frequency of the incoming beam of pulsed laser light.

7 Claims, 12 Drawing Sheets

ROTARYFROG SYSTEMS AND METHODS

RELATED APPLICATIONS

This application is a continuation-in-part of PCT/US2009/040582 filed Apr. 14, 2009, which is incorporated herein by reference in its entirety. This application also claims priority to U.S. Patent Application 61/044,757 filed Apr. 14, 2008, titled "Rotary FROG Systems and Methods," which is incorporated herein by reference in its entirety.

U.S. GOVERNMENT RIGHTS

This invention was made in part with the support of the U.S. Government; the U.S. Government has certain rights in this invention as provided for by the terms of Grant #60NANB4D1142, awarded by the National Institute of Standards and Technology.

BACKGROUND

Frequency Resolved Optical Gating (FROG) apparatus is used to measure the amplitude and phase, versus frequency of an incoming beam of pulsed laser light. Such apparatus is popular amongst experimenters partly because of the simplicity of the setup and partly due to the error checking robustness of its algorithm, which is not present in the alternative method known as SPIDER (Spectral Phase Interferometry for Direct Electric-field Reconstruction). The electric field can be uniquely described by, $E = A\, e^{i\phi}$, where A is the amplitude and $\phi$ is the phase, and they both depend on the frequency (or wavelength).

The phrase "frequency resolved optical gating" results from a theory that a short gate pulse can be used to obtain a sample from a longer pulse by nonlinear mixing (gating) in a nonlinear crystal material. Since a gate pulse shorter than the pulse to be measured is not usually available, FROG uses the pulse itself for gating.

There are different versions of FROG that rely upon different nonlinear gating mechanisms, that generate different kinds of FROG traces (requiring different phase retrieval algorithms), and that have different strengths and weaknesses. Polarization gated FROG (PG FROG) is the simplest known version, and uses a polarizer with a high extinction ratio to produce a signal that is analyzed by a spectrometer.

The self-difference FROG (SD FROG) version utilizes two overlapping beams in an $X^{(3)}$ medium to generate a nonlinear refractive index grating. The grating diffracts both overlapping beams into two new beams, one of which is used for detection. A disadvantage to this FROG version is that relatively large pulse energies are required for its operation.

The Transient-Grating FROG (TG FROG) version is similar to the SD FROG, but uses a third pulse with a variable delay as a probe that is diffracted at the grating generated by the other two beams to provide a much higher detection sensitivity than SD FROG.

The Second-Harmonic FROG (SHG FROG) version is the most popular FROG version and is based upon an $X^{(2)}$ nonlinear crystal that allows the apparatus to achieve a much higher sensitivity than is possible with $X^{(3)}$ crystals. Phase matching issues require careful treatment to avoid distortion for short pulses.

The Interferometric FROG (IFROG) version uses a collinear geometry to avoid a loss of temporal resolution via geometric effects (finite beam angles) in the characterization of few-cycle pulses.

One existing method for phase matching very weak pulses of laser light is to dither a thick crystal in front of the beam. This method, however, introduces several problems. Since the incident angle is exposed to varying thicknesses of the crystal, dependent on the angle of incidence, the efficiency and the bandwidth of the SHG varies. The crystal also requires a supporting geometry with a mechanism to introduce acceleration and deceleration for a continuous acquisition. Control of such continuous change in motion of the crystal is difficult to achieve and requires that the acceleration and deceleration be incorporated into measurements when a velocity control mode is used. Also, the changing angle between the incident light and the crystal surface results in varying reflectivity off the surface of the crystal. Also, as the crystal rotates, the beam's spot size inside the crystal varies resulting in non-uniform SHG efficiencies.

SUMMARY

In an embodiment, a method determines amplitude and phase versus frequency of an incoming beam of pulsed laser light. An apparatus is set to an initial configuration such that the incoming beam is split into two beams of substantially equal intensity. One of the two split beams is delayed for a delay period t and then the two split beams are recombined to form a recombined beam. The recombined beam shines onto a thick SHG crystal at rotation angle θ and light emitted from the thick SHG crystal is detected as data. The data is stored with reference to the delay period t and the angle θ. The thick SHG crystal is rotated by an angle δθ and the steps of splitting, delaying, recombining, shining, detecting, storing, and rotating are repeated until the thick SHG crystal has completed 360° of rotation. The delay period t is increased by δt and the steps of splitting, delaying, recombining, shining, detecting, storing, rotating, repeating and increasing are repeated until a selected beam delay period range has been completed. The stored data is then processed to determine amplitude and phase versus frequency of the incoming beam of pulsed laser light.

In another embodiment, a system determines amplitude and phase versus frequency of an incoming beam of pulsed laser light and includes: a first beam splitter for splitting the incoming beam into first and second beams having substantially equal intensity; a translation time delay stage for delaying one of the first and second beams; a second beam splitter for recombining the first and second beams into a combined beam; a second-harmonic generation crystal mounted in a rotational stage, the second-harmonic generation crystal generating second-harmonic light from the combined beam; a detector for detecting the second harmonic light as data; and a controller for (a) controlling the translation time delay stage and the second-harmonic generation crystal rotational stage, (b) recording the data in association with positions of the translation time delay stage and the second-harmonic generation crystal rotational stage, and (c) processing the data and positions to determine the amplitude and phase versus frequency of the incoming beam of pulsed laser light.

In another embodiment, a method determines amplitude and phase versus frequency of an incoming beam of pulsed laser light. An apparatus is configured to split the incoming beam into a first and a second beam of substantially equal intensity, to use a translation stage to delay the second beam in comparison to the first beam, to pass the first and second beams though a rotating half-wave plate, to converge the first and second beams onto a rotating thick SHG crystal such that an SHG beam is generated by the crystal, to pass the generated SHG beam through a spatial filter and to capture the filtered SHG beam using a detector. A detector sample rate, a half-wave plate rotational velocity, a thick SHG crystal rotational velocity, and a translational stage velocity are determined and the half-wave plate is rotated at the half-wave plate rotational velocity, the thick SHG crystal is rotated at the thick SHG crystal rotational velocity, and the translational stage is initialized and moved at the translational stage velocity. Light is detected from the thick SHG crystal as data and stored in a data set with a delay period t defined by a position of the translational stage, an angle φ based upon a rotational position of the half-wave plate, and an angle θ based upon a rotational position of the thick SHG crystal. The steps of detecting and storing are repeated at the detector sample rate until a set of data is complete. The data set is then processed to determine the amplitude and phase versus frequency of the incoming beam of pulsed laser light.

A RotaryFROG apparatus determines amplitude and phase versus frequency of an incoming beam of pulsed laser light. The RotaryFROG apparatus includes a first beam splitter for splitting the incoming beam into first and second beams having substantially equal intensity. The apparatus also includes a translation time delay stage for delaying one of the first and second beams, a second beam splitter for recombining the first and second beams into a combined beam, a half-wave plate mounted in a rotational stage and rotating at a half-wave plate rotational velocity, the half-wave plate controlling an orientation of the polarized light of the combined beam, a second-harmonic generation crystal mounted in a rotational stage and rotating at a SHG crystal rotational velocity, the second-harmonic crystal generating second-harmonic light from the combined beam, a detector for detecting the second-harmonic light as data, and a processor for controlling rotational positions of the half-wave plate and the second-harmonic generation crystal and for storing the data in association with rotational positions of the half-wave plate and the second-harmonic generation crystal. The processor processes the data and the rotational positions to determine the amplitude and phase versus frequency of the incoming beam of pulsed laser light, and also its polarization state.

DETAILED DESCRIPTION OF THE FIGURES

In the following description, detectors may include none, one, or more spatial and/or wavelength filters without departing from the scope hereof. Further, although exemplary angular ranges, such as 0-360° and 0-90°, are shown in the following examples, other ranges may be used without departing from the scope hereof. For example, where useful information is collected over a certain angular range, the angular motion may be limited to this range to avoid wasting time collecting unwanted data.

Figure 1:
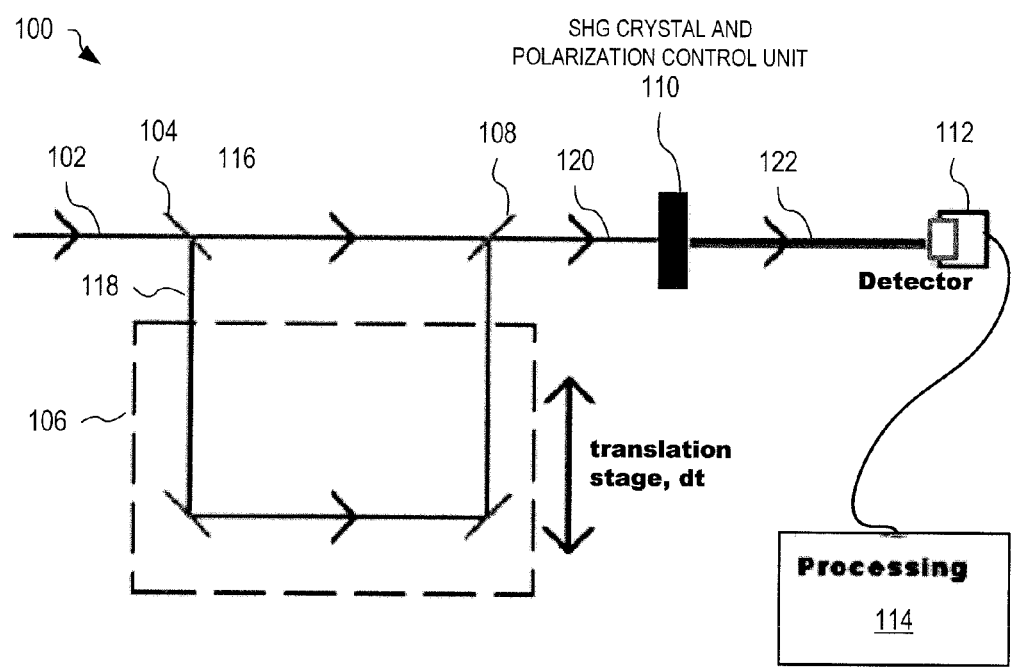
FIG. 1 shows one exemplary schematic of a Rotary Frequency Resolved Optical Gating (RotaryFROG) apparatus.

FIG. 1 shows one exemplary schematic of a Rotary Frequency Resolved Optical Gating (RotaryFROG) apparatus 100, including a beam splitter 104, a translation time delay stage 106, a second beam splitter 108 for recombination of the original and the time delayed beams, a second harmonic generation (SHG) crystal and polarization control unit 110 and a detector 112 for detecting the resulting beam after second harmonic generation. The electric field of an input beam 102 of light, E, in time domain may be described either by a cosine function or using complex notation:

$$E(t) = E_0 \cos(\omega t + \phi)$$

$$= E_0 \frac{[e^{i(\omega t + \phi)} + e^{-i(\omega t + \phi)}]}{2}$$

$$= \frac{E_0}{2}[e^{i(\omega t + \phi)} + c.c.]$$

Equation 1

The spatial properties of the electric field are not included in the above formulae since the geometry of the shown RotaryFROG apparatus 100 is collinear, and therefore the analysis thereof need be concerned only with time at any wave front.

Beam splitter 104 splits input beam 102 such that half of its intensity becomes split beam 118, which is sent towards time delay stage 106, while the other half of its intensity becomes split beam 116, which proceeds unchanged, except for intensity. At time delay stage 106, E(t) becomes E(t+δt) since the optical path length of split beam 118 is physically adjusted using two mirrors (e.g., a corner cube on a translation stage). δt is varied over at least one complete pulse length d, bearing in mind that the optical path change of split beam 118 is twice the translation stage motion ($d = \delta t c_0 / 2$).

When these split beams 116, 118, meet again at the second beam splitter 108, the original beam 116 and the time delayed beam 118 combine as a beam 120 to give:

$$E_{recomb}(t)=E(t)+E(t+\delta t) \qquad \text{Equation 2}$$

Beam 120 is then sent through SHG crystal and polarization control unit 110 (e.g., a Beta Barium Borate or BBO crystal) to create a second harmonic generation of $E_{recomb}(t)$. A second harmonic term output 122 of SHG crystal and polarization control unit 110 may be expressed as:

$$E_{recomb}^{(2)}(t)=\chi''(E(t)+E(t+\delta t))^2=\chi''(E(t)^2+E(t+\delta t)^2+2E(t)E(t+\delta t)) \qquad \text{Equation 3}$$

There is a significant difference between RotaryFROG and other FROG instruments. An SHG FROG does not use a collinear arrangement of beams entering the crystal. Instead the SHG FROG utilizes an angular difference between the original and the time delayed beams to spatially differentiate and filter Second Harmonic, Sum Frequency, and Difference Frequency terms generated by the crystal. With RotaryFROG apparatus 100, on the other hand, as in other collinear configurations, all light after SHG crystal and polarization control unit 110 is collected by detector 112 for further analysis by a processing unit 114. That is, RotaryFROG apparatus 100 need not utilize a spectrometer. Detector 112 accomplished the same functions, but is a simpler detector than a spectrometer.

To obtain frequency versus phase and amplitude, a spectrum of the pulse at every δt is collected by using SHG crystal and polarization control unit 110 in a more efficient way than used on other FROG instruments. The thickness of a SHG crystal within SHG crystal and polarization control unit 110 is increased such that phase-matching bandwidth is reduced, and the thicker the SHG crystal is, the narrower the SHG bandwidth becomes, according to:

$$\delta\lambda \approx \frac{0.44\lambda_0/L}{\left|n'(\lambda_0)-\frac{1}{2}n'(\lambda_0/2)\right|} \qquad \text{Equation 4}$$

where n' is the gradient of the refractive index with respect to wavelength, $\lambda_0$ the control wavelength, and L is the thickness of the crystal.

To use SHG crystal and polarization control unit 110 as, or in place of, a spectrometer for scanning through the range of wavelengths present in the incoming beam, a narrow frequency range must be selectively phase-matched through the crystal. This has been independently demonstrated by "dithering" a thick crystal in front of a detector. There are three implications to this "dithering" concept. Firstly, complexity from the use of a spectrometer (especially if a specialized unit is required for capturing weak spectra) is eliminated by noting the SHG wavelength at a given rotational position of the crystal. Secondly, the added thickness of the crystal, while reducing the passable bandwidth at a given time (see Equation 4), increases the efficiency of the second harmonic generation (see Equation 6) of the incoming beam by a square factor and therefore SHG output may be created for much weaker input signals. Thirdly, instead of using the detector from a spectrometer to capture light (typically designed for wavelength uniformity and range), a much more sensitive detector, such as a photomultiplier tube (PMT), may be used. Thus, the combination of a more sensitive detector and more efficient SHG provides improvements in the overall sensitivity of the instrument.

A spectrum may be obtained by using a thick crystal (i.e., the SHG crystal within SHG crystal and polarization control unit 110) and scanning over a range of wavelengths to build up the spectrum from narrow wavelength slivers. The spectrum of Equation 3 for second harmonic term output 122 is the squared amplitude of its Fourier transform as shown:

$$E(\omega)=|\int_{-\infty}^{\infty}E_{recomb}e^{i\omega t}dt|^2 \qquad \text{Equation 5}$$

Figure 2:
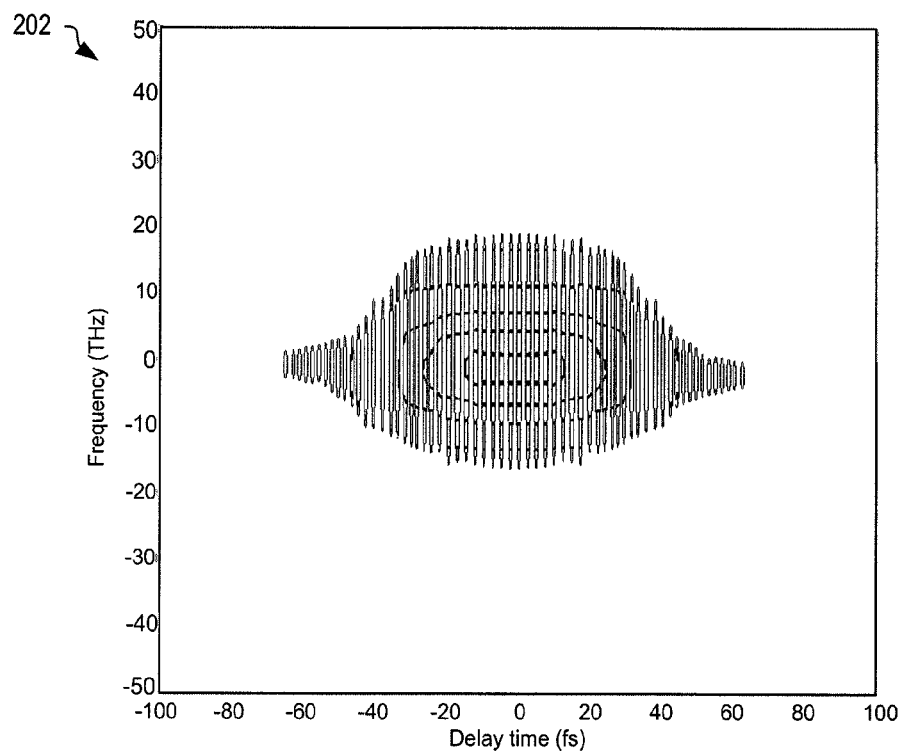
FIG. 2 shows a plot of spectra taken at discrete time delayed steps and a plot of a Fourier domain calculated therefrom.
Figure 2:
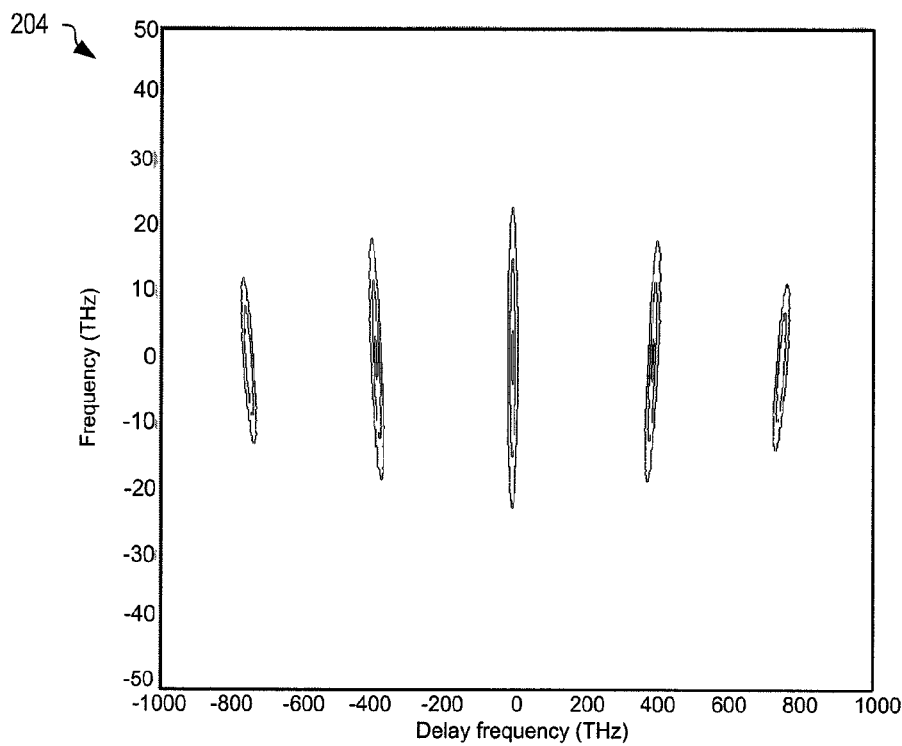

The result of equation 5 is five terms at delay-frequencies $0, +/-f_0, +/-2f_0$, as pictorially illustrated in FIG. 2. In particular, FIG. 2 shows a plot 202 of spectra expected for second harmonic term output 122 at discrete time delayed steps, and a plot 204 of a Fourier domain expected from the data of plot 202.

Since the intensity observations are all real values, the Fourier components on the negative delay frequency spectrum are complex conjugates of the positive values and allow concentration on the positive half of the delay frequency spectra without loss of generality.

Thick Crystal Design for Rotation

Figure 3:
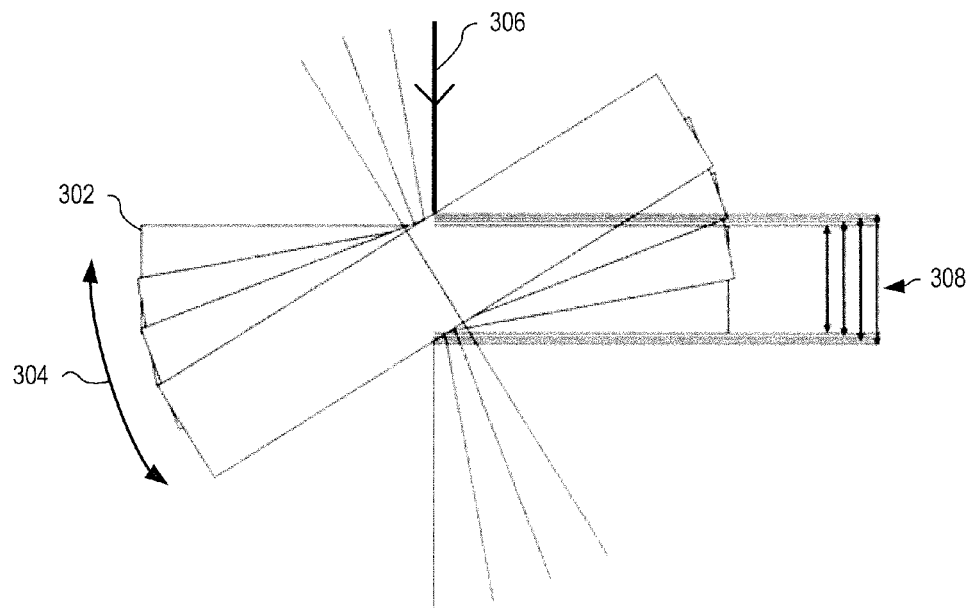
FIG. 3 shows different thicknesses of a prior art dithered crystal through which an incident pulse will travel, resulting in varying phase-matching efficiency and second harmonic generation (SHG) bandwidth at different wavelengths.

Although useful in some instances, there are disadvantages to the prior art solution of dithering. First, as shown in FIG. 3, as a crystal 302 is dithered (in the direction of arrow 304), the incident pulse 306 will travel through different thicknesses 308 of crystal 302. Therefore, at different wavelengths, phase-matching efficiency and SHG bandwidth will vary. The dithering also has negative implications on the anti-reflection coating applied on crystal 302. Second, for a continuous, non-stepping, dithering device, the mechanical motion of the crystal results in unwanted periods affected by acceleration, steady speed periods and deceleration motions. These effects essentially manifest themselves as varying SHG dwell times at various wavelength regions.

To overcome some of the disadvantages of the prior art dithering method, apparatus 100 of FIG. 1 uses a constant speed rotation or incremental stepping of a thick crystal for phase-matching over a broad range of wavelengths. The use of the thick crystal provides for efficient SHG, allowing FROG measurements to be made with even weak and broadband pulses. This configuration, as shown in FIG. 1, also provides FROG type information over a range of polarizations, thereby adding another measurement parameter for observing the physics of light propagation in various media.

Figure 4:
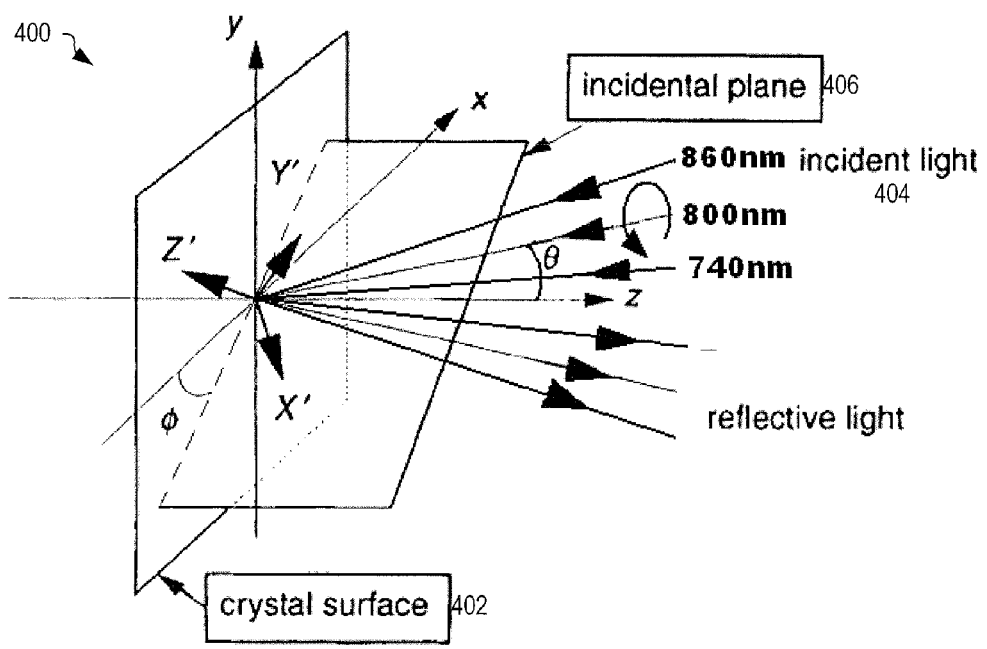
FIG. 4 shows exemplary geometry for a uniaxial birefringent crystal surface and a beam of incident light, illustrating a physical rotational axis of the crystal, and the optical axis of the crystal.

FIG. 4 shows exemplary geometry 400 for a uniaxial birefringent crystal surface 402 and a beam of incident light 404 according to the present application. FIG. 4 further illustrates a physical rotational axis (Z) of the crystal (i.e., the SHG crystal within SHG crystal and polarization control unit 110, FIG. 1), and the optical axis of the crystal which for uniaxial crystals may be considered a plane 406.

For a birefringent material, the indices of refraction for ordinary and extraordinary rays are different. This difference is seen in various crystals, certain plastics, and sometimes in transparent materials under non-uniform stress. Phase-matching, necessary for Second-Harmonic-Generation, may be achieved in birefringent materials in eight ways (five of which are unique) depending upon input and output polarization from the crystal. However, for the purpose of brevity, only one of these known ways is discussed below, namely type I phase-matching, where two ordinary polarized beams of carrier frequency ω combine in the crystal to produce an extraordinary polarized beam at 2ω. One of ordinary skill in the art, however, after reading and comprehending the present application, will understand how the other known ways may be applied to the present application. The efficiency in producing 2ω is:

$$\eta_{SHG} = \frac{P_{2\omega}}{P_\omega} \quad \text{Equation 6}$$

$$= 2\left(\frac{\mu}{\varepsilon_0}\right)^{3/2} \frac{\omega^2 d^2 l^2}{n^3} \frac{\sin^2(\Delta k l/2)}{(\Delta k l/2)^2} \frac{P_\omega}{A}$$

Where: $P_\omega$=total optical input power at $\omega$;
$P_{2\omega}$=total optical output power at $2\omega$;
$\mu$=magnetic permeability of the material;
$\varepsilon_0$=permittivity of free space;
d=nonlinear optical coefficient;
l=crystal path length;
n=refractive index at $\omega$ and $2\omega$;
$\Delta k$=the difference between the two k vectors (k=w n/c) of the incoming beams k1 and k2 and the output vector k3, i.e., $$\Delta k = k1 + k2 - k3 = 2\omega n^{(\omega)}/c - \omega n^{(2\omega)}/c = 2\omega/c[n^{(2\omega)} - n^{(\omega)}],$$
and $$\frac{P_\omega}{A} = \text{intensity of the beam}$$

The efficiency in producing $2\omega$ is highest when l (crystal path length) is maximized (since coherence length issues are being ignored due to the narrow wavelengths under consideration for phase-matching), and $\Delta k$ is minimized.

$\delta k = 0$ is achieved at $n^{(2\omega)} = n^{(\omega)}$. Using the birefringent material, we have to orient the crystal in such a way that the index of refraction of the crystal at $\omega$, $n^{(\omega)}$, with ordinary polarization of the incoming light, matches the index of refraction of the crystal at $2\omega$, $n^{(\omega)}$ by varying $\theta$:

$$\frac{1}{n_e^2(\theta)} = \frac{\cos^2\theta}{n_0^2} + \frac{\sin^2\theta}{n_e^2} \quad \text{Equation 7}$$

Figure 6:
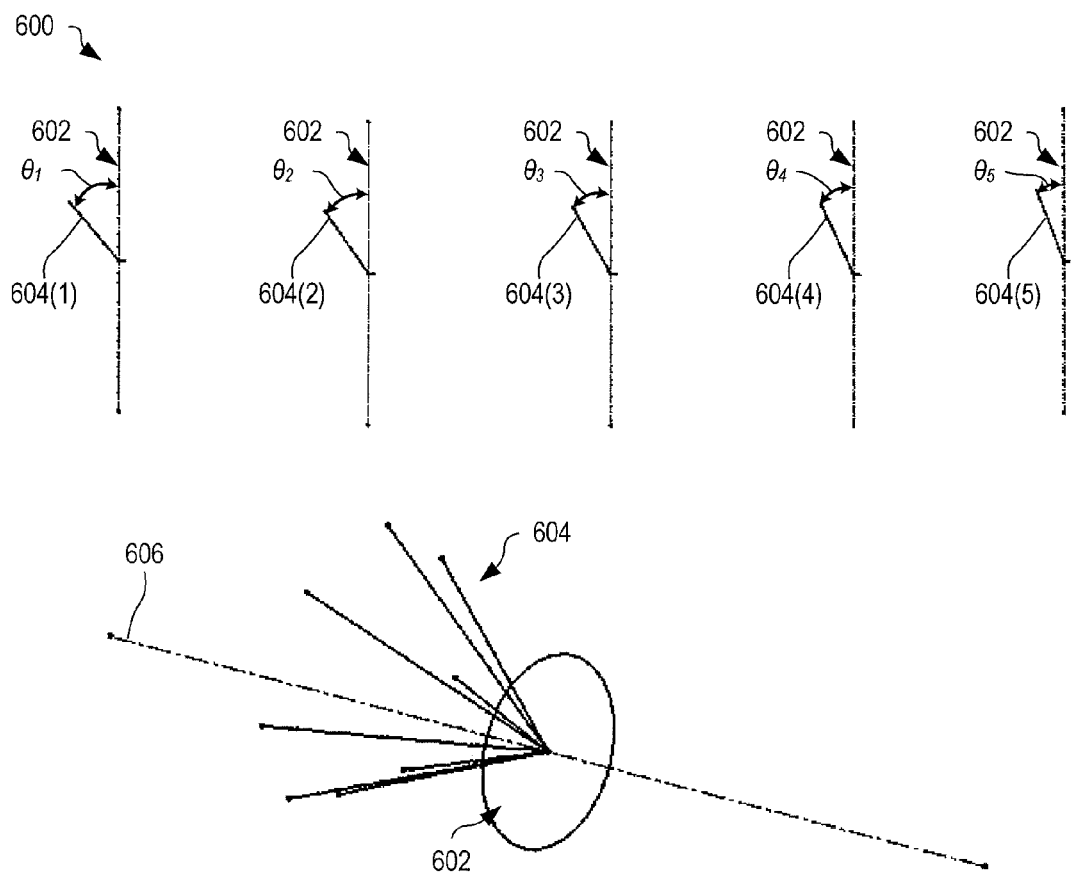
FIG. 6 shows light beams having different wavelengths and different phase-matching angles relative to a surface of a crystal for SHG to occur.

Beta Barium Borate (BBO), for this example, is selected as the SHG crystal as being a negative (the refractive index of its extraordinary axis is smaller than the refractive index of its ordinary axis) uniaxial (material has one axis of anisotropy, where there are no variations of the optical index in that one plane) crystal. As shown in FIG. 6, beams 604(1)-604(5) have different wavelengths and require different phase-matching angles $\theta_1$-$\theta_5$, respectively, relative to a surface 602 of the crystal for SHG to occur. These angles may be arranged in a circular fashion by aligning the optical axis 606 for all these phase-matching angles.

Figure 5:
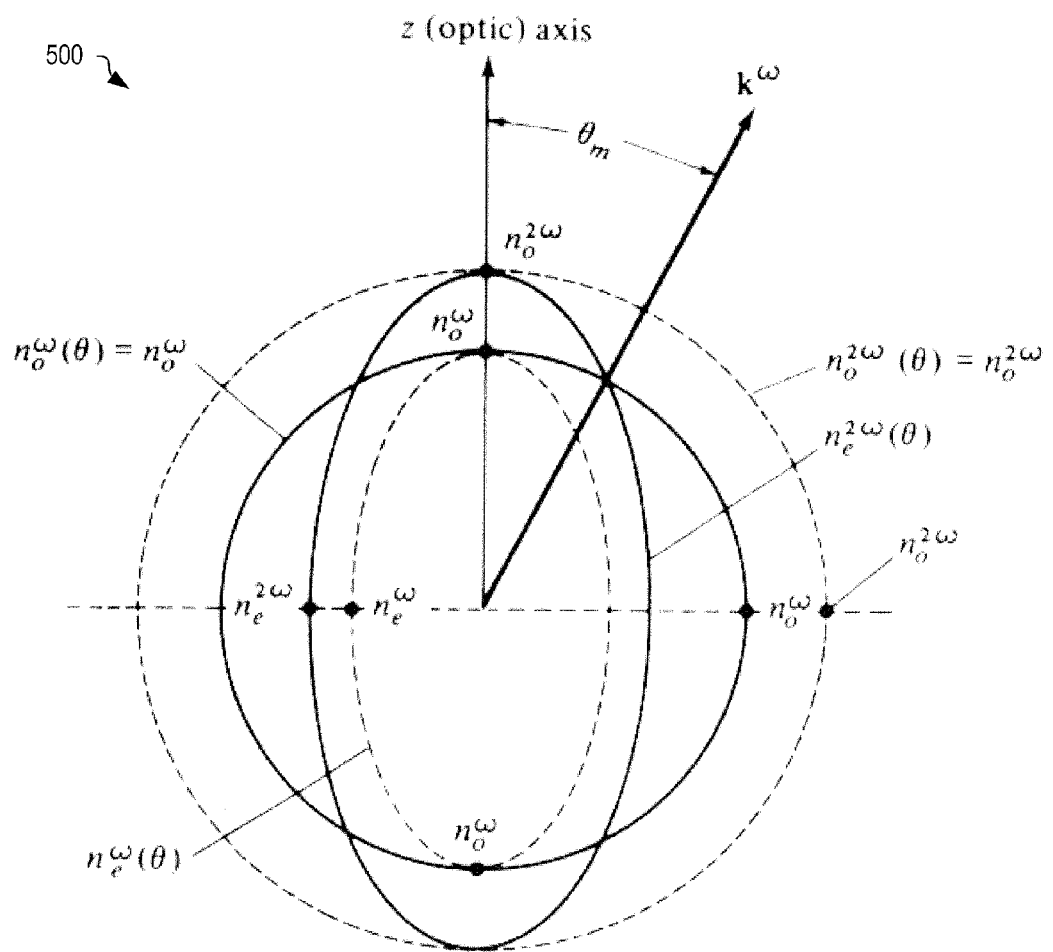
FIG. 5 shows a matching of an intersecting point of an oval $n_e^{2\omega}$ and a circle $n_o^{\omega}$ to find a phase-matching angle of a crystal for an incoming beam of light.

FIG. 5 shows a matching of an intersecting point of an oval $n_e^{2\omega}$ and a circle $n_o^\omega$ to find a phase-matching angle of the crystal for an incoming beam of light. So, by referring to equation 7 and FIG. 5, phase-matching angles over the entire range of the pulse bandwidth may be determined. An appropriate crystal may be designed by considering the requirements as a phase-matching bandwidth of 120 nm centered at 800 nm that encompasses the entire pulse bandwidth and also includes margins.

Figure 7:
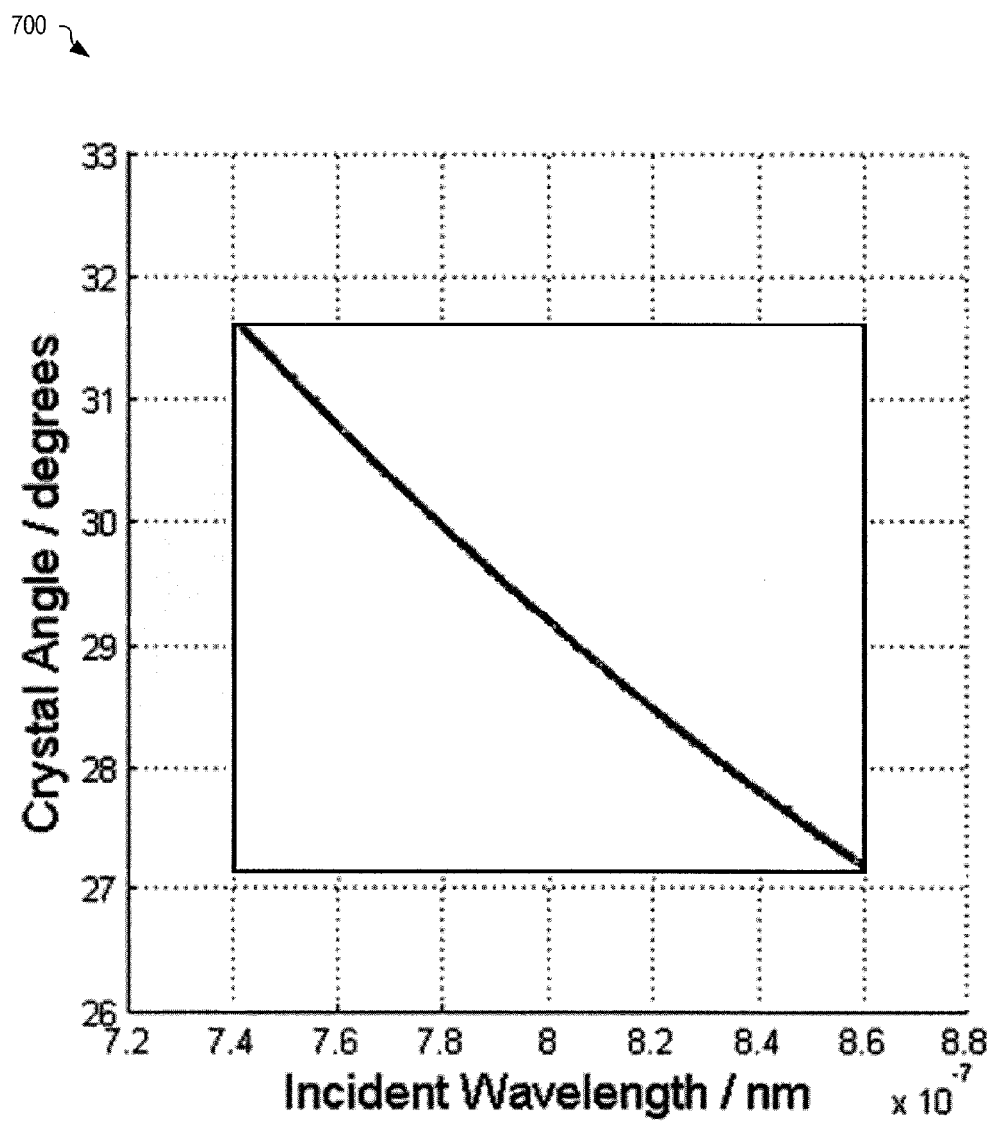
FIG. 7 shows a plot illustrating incident wavelength of light plotted against crystal angle.

FIG. 7 shows a plot 700 illustrating incident wavelength of light plotted against crystal angle. The phase-matching angles are calculated for incident light wavelengths of $\lambda_{Low}$=740 nm and $\lambda_{High}$=860 nm, corresponding to $\theta_{740}$=27.185° and $\theta_{860}$=31.655° (see FIG. 7), giving a difference in angle of 4.47°, $\Delta\theta_{Phase-matching}$. $(\Delta\theta_{Phase-matching})/2$ is an important value in the selected geometry of apparatus 100, FIG. 1.

Ignoring all polarization effects, which will be addressed below, an incident beam of broadband light on a BBO crystal, cut such that the angle to the Optical Axis (OA) is 29.420° results in a SHG beam at 400 nm (SHG of 800 nm). When rotating the BBO crystal from 0 to 360° about the incident beam, phase-matching at 800 nm is continuous. Maintaining the 29.420° axis as the rotational axis but shining the incident broadband beam at 27.185° to the OA in the incident plane, phase-matching occurs at 740 nm when the rotational axis is at 0°. When rotated 180° about the rotational axis, phase-matching occurs at 860 nm for 90° and at ~800 nm for 270°. Thus, in one complete rotation of the BBO crystal, the entire bandwidth will be phase-matched twice. Throughout the rotation, the incoming beam is at an incident angle of 2.235° from the normal of the crystal's surface 402 and therefore travels the same distance through the crystal regardless of the phase-matched wavelength.

The present inventors contemplate another embodiment of this arrangement with a tradeoff. With reference to equation 6, it can be seen that $d_{eff}$, the effective nonlinear coefficient, plays a part in the $\eta_{SHG}$ value. For type I phase-matching in a negative crystal, $d_{eff}$ is calculated according to:

$$d_{eff}^{type-I} = (d_{11}\cos 3\phi - d_{22}\sin 3\phi)\cos\theta + d_{31}\sin\theta \quad \text{Equation 8}$$

where $d_{11}$=5.8×0.38 pm/V, $d_{31}$=0.05$d_{11}$, and $d_{22}$<0.05$d_{11}$. Phase-matching efficiency may be increased for half of the revolution at the expense of reducing the phase-matching efficiency for the other half of the revolution. By cutting the crystal at a $\phi$ angle of $(\Delta\theta_{Phase-matching})/2$ (i.e., 2.235°), at the 90° rotation position, phase-matching occurs at ~800 nm. The incident beam is incident on the crystal OA at 29.420° with $\phi$ angle of 0° (which would otherwise have been 2.235°).

For the arrangement discussed immediately above, the efficiency of operation is increased by a small amount (<10%) at the designed frequency (in this case~800 nm) and intensity is slightly reduced for fringe wavelengths. The instrument also requires calibration for crystal axis orientation, phase-matching wavelength versus position of the rotating stage, wavelength response of the detector, phase-matching bandwidth versus center wavelength, and phase-matching efficiency versus wavelength Polarization Effects Nonlinear crystals can only phase-match beams under specific polarizations. Since an incoming beam of light must have ordinary polarization with respect to the crystal OA, and the output of the crystal for type I phase-matching is perpendicular to the incoming ray, the incoming beam should rotate at the same rate as the crystal to maintain a constant incoming polarization relative to the crystal. One option for achieving the same rotation rate is to use a rotating half-wave plate in the beam path. This may apply to both non-linear and co-linear configurations.

The half-wave plate in the optical path can be used for obtaining the polarization content of the input beam. When mounted on two different stages, the nonlinear crystal and the half-wave plate can be stepped in one of the two following modes.

In a pure FROG mode, the half-wave plate is aligned to produce the maximum SHG intensity from the crystal, which determines the main polarization plane on the crystal. Once this optimum position has been found, the half-wave plate tracks the rotation of the crystal which steps through the wavelengths to compile a two-dimensional matrix of wavelength versus intensity at optimum polarization.

In a RotaryFROG-with-polarization-information mode, for each rotation step of the SHG crystal, the half-wave plate will complete a 360° polarization rotation scan. The result of this will be a three dimensional matrix of the wavelengths, with the intensity being output at such wavelengths and the 0 to 360° (or a range selected by the operator) polarization states. The polarization allows measurement of the intensity at various polarizations, which may be useful for many experiments.

Figure 8:
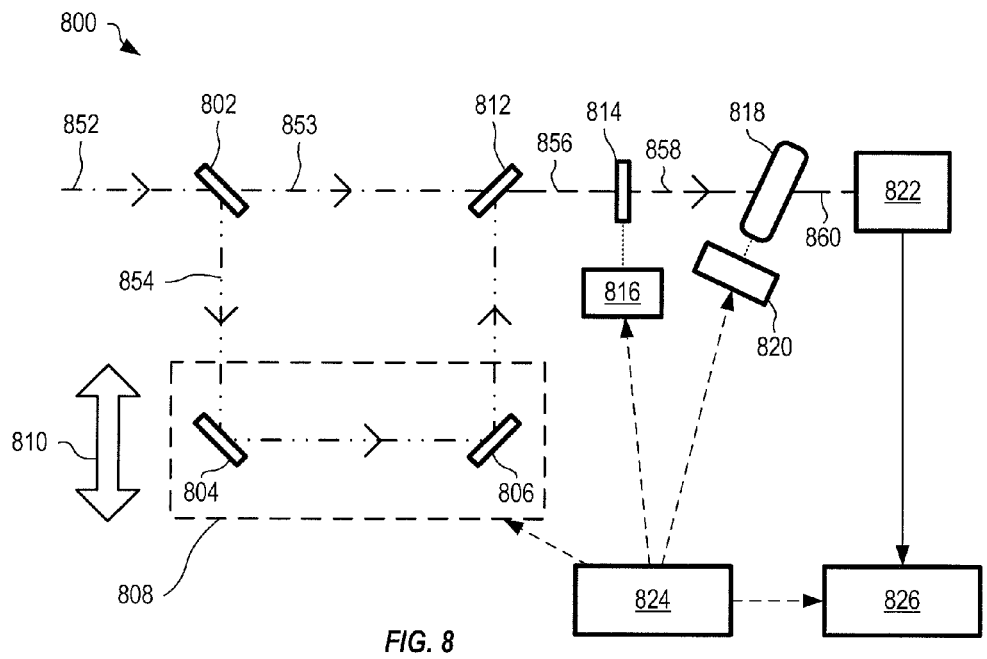
FIG. 8 shows one exemplary RotaryFROG apparatus using collinear geometry for determining amplitude and phase versus frequency of an incoming beam of pulsed laser light.

FIG. 8 shows one exemplary RotaryFROG apparatus 800 for determining amplitude and phase versus frequency of an incoming beam 852 of pulsed laser light. Apparatus 800 has a first and second beam splitters 802, 812, two mirrors 804 and 806 mounted on a translational stage 808, a half-wave plate 814 mounted in a first rotational stage 816, a thick SHG crystal 818 mounted in a second rotational stage 820, a detector 822, a controller 824, and a data processor 826.

In one example of operation, first beam splitter 802 splits incoming beam 852 into two beams 853, 854 of substantially equal intensity. Beam 854 is reflected by mirrors 804 and 806 and is then recombined with beam 853 at second beam splitter 812 to form beam 856. Beam 856, after passing through half-wave plate 814, becomes beam 858 which is incident upon thick SHG crystal 818. Although half-wave plate 814 is shown perpendicular to beam 856, the angle of half-wave plate 814 relative to beam 856 may be adjusted for optimal control. Thick SHG crystal 818 generates SHG beam 860 that is then detected by detector 822 to produce data that is sent to data processor 826, where the data may be stored and processed. Controller 824 controls translation stage 808, first rotational stage 816, and second rotational stage 820 to compile one or both of: (a) a two dimensional matrix of wavelength versus intensity at optimum or desired polarization; and (b) a three dimensional matrix of the wavelengths, the intensity being output at such wavelengths and also the 0 to 360° polarization states.

Controller 824 may represent a LABVIEW™ interface, and data processor 826 may represent MATLAB™, for example.

Figure 9:
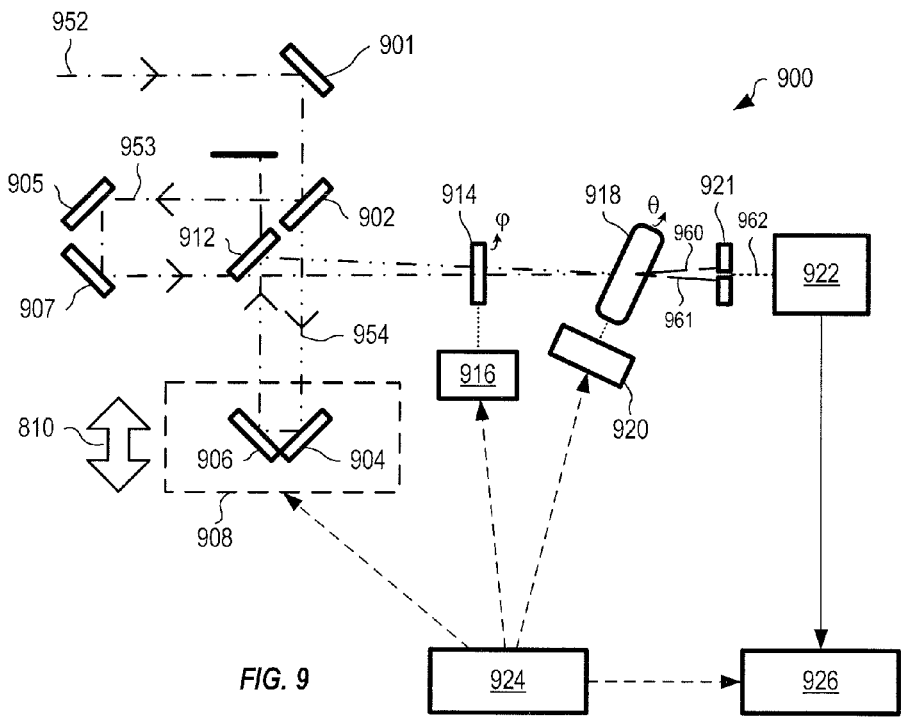
FIG. 9 shows one exemplary RotaryFROG apparatus using non-collinear geometry for determining amplitude and phase versus frequency of an incoming beam of pulsed laser light.

FIG. 9 shows one exemplary RotaryFROG apparatus 900 using non-collinear geometry for determining amplitude and phase versus frequency of an incoming beam 952 of pulsed laser light. Apparatus 900 has first and second beam splitters 902, 912, two mirrors 904 and 906 mounted on a translational stage 908, three other fixed mirrors 901, 905 and 907, a half-wave plate 914 mounted in a first rotational stage 916, a thick SHG crystal 918 mounted in a second rotational stage 920, a spatial filter 921, a detector 922, a controller 924, and a data processor 926. Mirror 901 is optional, depending upon a direction of incoming beam 952. As noted above, detectors may include wavelength filtering that allows only the SHG light to pass through. As known in the art, wavelength filtering may be implemented using diffraction gratings or optical glass filters.

In one example of operation, first beam splitter 902 splits incoming beam 952 into two beams 953, 954 of substantially equal intensity. Beam 954 is reflected by mirrors 904 and 906 and is then reflected to converge upon thick SHG crystal 918 at second beam splitter 912. Beam 953 is reflected by mirrors 905 and 907 to converge onto thick SHG crystal 918. Beams 953 and 954 pass through half-wave plate 914 and are incident upon thick SHG crystal 918. Thick SHG crystal 918 generates SHG beams 960 and 961 that are filtered by spatial filter 921 to leave SHG beam 962 that is then filtered and detected by detector 922 to produce data that is sent to data processor 926, where the data may be stored and processed. Controller 924 controls translational stage 908, first rotational stage 916, and second rotational stage 920 to compile one or both of: (a) a two dimensional matrix of wavelength versus intensity at optimum (or user selected) polarization; and (b) a three dimensional matrix of the wavelengths, the intensity being output at such wavelengths and also the 0 to 360° (or user selected range) polarization states.

Figure 10:
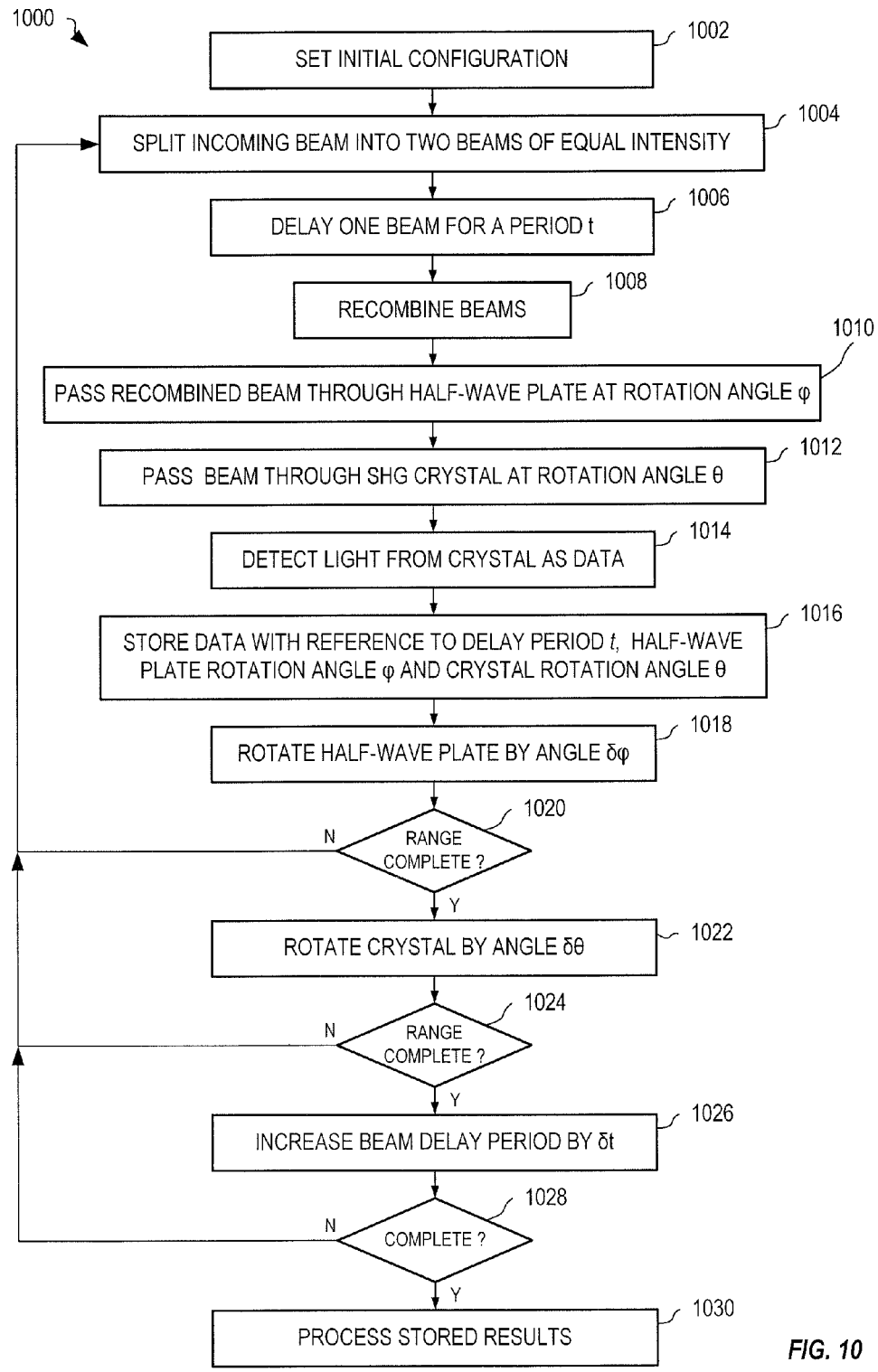
FIG. 10 is a flowchart illustrating one exemplary RotaryFROG method for determining amplitude and phase versus frequency of an incoming beam of pulsed laser light.

FIG. 10 is a flowchart illustrating one exemplary Rotary-FROG method 1000 for determining amplitude and phase versus frequency of an incoming beam of pulsed laser light.

In step 1002, method 1000 sets apparatus 800, FIG. 8, to an initial configuration. In one example of step 1002, translation stage 808 is set to provide an initial time delay of t, half-wave plate 814 is set to an initial angle φ and thick SHG crystal 818 to an initial angle θ. In step 1004, method 1000 splits the incoming beam into two beams of substantially equal intensity. In one example of step 1004, incoming beam 852 is split into two beams 853, 854 of substantially equal intensity by first beam splitter 802. In step 1006, method 1000 delays one beam for a period t. In one example of step 1006, translation stage 808 and mirrors 804 and 806 delay beam 854 by a period t. In step 1008, method 1000 recombines the beams split in step 1004. In one example of step 1008, second beam splitter 812 recombines beams 853 and 854 into beam 856.

Step 1010 is optional. In step 1010, method 1000 passes the recombined beam through the half-wave plate at angle φ. In one example of step 1010, beam 856 passes through half-wave plate 814 at angle φ, as controlled by first rotational stage 816, to produce beam 858.

In step 1012, method 1000 passes the beam through the SHG crystal at rotation angle θ. In one example of step 1012, beam 858 passes through thick SHG crystal 818 at angle θ, as controlled by second rotational stage 820, to form SHG beam 860. In step 1014, method 1000 detects the light emitted from the SHG crystal as data. In one example of step 1014, detector 822 detects SHG beam 860 and generates data. As noted above, the detector may also filter the light prior to detecting it. For example, detector 822 may include wavelength filtering without departing from the scope hereof. In step 1016, method 1000 stores the data with reference to delay period t, half-wave plate rotation angle φ and SHG crystal rotation angle θ. In one example of step 1016, detector 822 sends the captured data to data processor 826 where the data is stored in association with the current delay period t of translation stage 808, the current rotation angle φ of first rotational stage 816 (i.e., the current rotational angle of half-wave plate 814), and the current rotation angle θ of second rotational stage 820 (i.e., the current rotational position of thick SHG crystal 818).

In step 1018, method 1000 rotates the half-wave plate by angle δφ. In one example of step 1018, controller 824 controls first rotational stage 816 to rotate half-wave plate 814 by the same angle δφ. Step 1020 is a decision step. If, in step 1020, method 1000 determines that the half-wave plate has completed 90° of rotation, method 1000 continues on to step 1022, otherwise method 1000 repeats steps 1004 through 1018 until half-wave plate has completed a desired range (e.g., 90°) of rotation. Note, only 90° of rotation of the half-wave plate is required, since further rotation could result in unnecessary repetition. Smaller ranges may be used where specific measurements are desired to reduce the measurement time.

In step 1022, method 1000 rotates the SHG crystal by the angle δθ. In one example of step 1022, controller 824 controls second rotational stage 820 to rotate thick SHG crystal 818 by the angle δθ. Step 1024 is a decision step. If, in step 1024, method 1000 determines that the SHG crystal has completed a desired range (e.g., 180°) of rotation, method 1000 continues onto step 1026; otherwise method 1000 repeats steps 1004 though 1022 until SHG crystal has completed the desired range of rotation. Note, only 180° of rotation of the crystal is required, since further rotation could result in unnecessary repetition. Smaller ranges may be used where specific measurements are desired to reduce the measurement time.

In step 1026, method 1000 increases beam delay period by δt. In one example of step 1026, controller 824 controls translation stage 808 to increase path length of beam 854 equivalent to a delay change of δt. Step 1028 is a decision step. If, in step 1028, method 1000 determines that the desired beam delay period range has been completed, method 1000 continues on to step 1030; otherwise method 1000 repeats steps 1004 though 1026 until the desired beam delay period range has been completed.

In step 1030, method 1000 processes the stored results of step 1016 to determine amplitude and phase versus frequency of the incoming beam of pulsed laser light. In one example of step 1030, data processor 826 processes stored data to determine amplitude and phase versus frequency of the incoming beam of pulsed laser light.

The ordering of steps within method 1000 may change without departing from the scope hereof. For example, the order in which method 1000 adjusts (a) the angle of the half-wave plate, (b) the angle of the SHG crystal, and (c) the delay period of the split beam may be changed as appropriate for ordering of the resulting data, as will be appreciated by one of ordinary skill in the art after reading and comprehending the present application.

Figure 11:
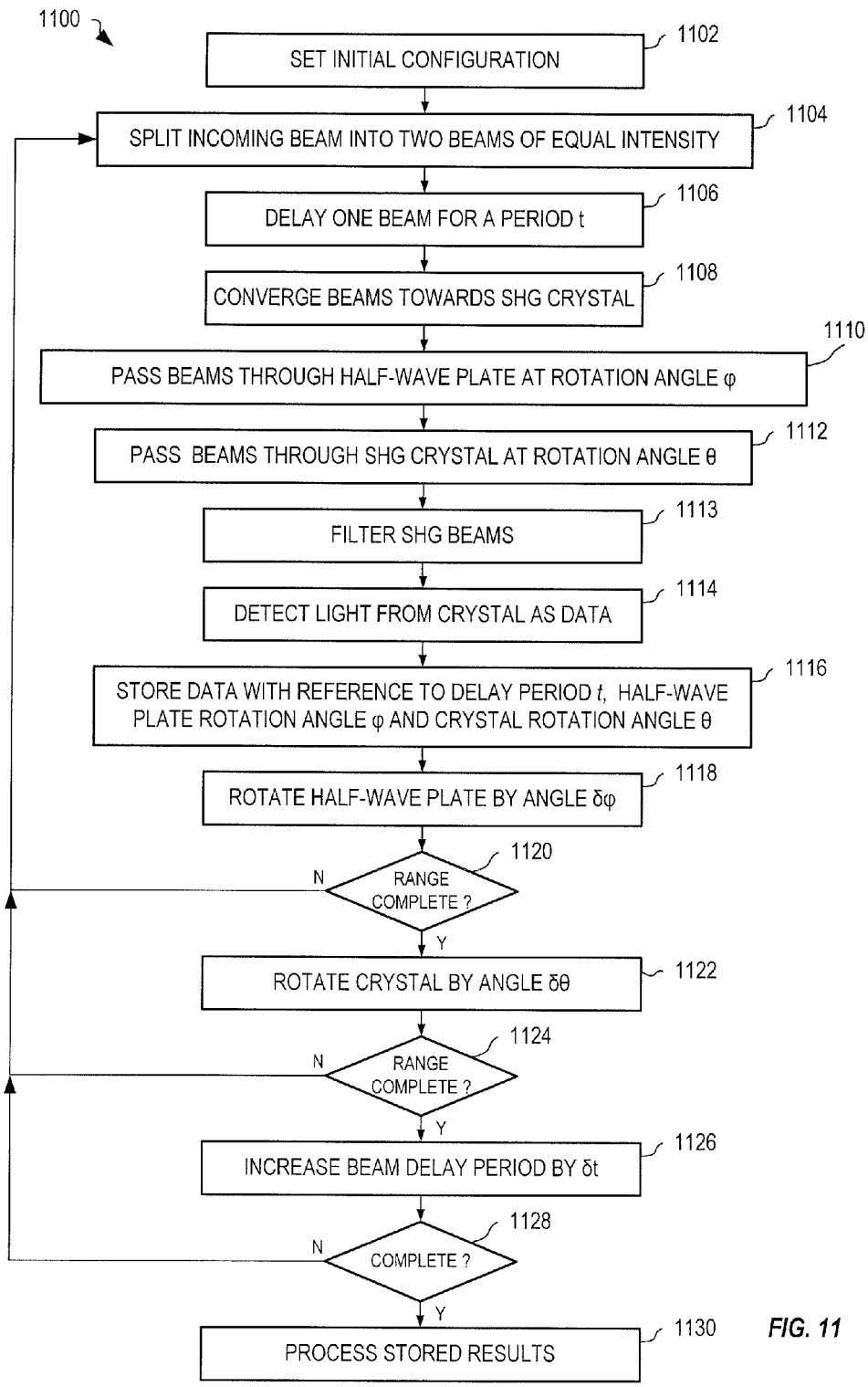
FIG. 11 is a flowchart illustrating one exemplary RotaryFROG method for determining amplitude and phase versus frequency of an incoming beam of pulsed laser light.

FIG. 11 is a flowchart illustrating one exemplary Rotary-FROG method 1100 for determining amplitude and phase versus frequency of an incoming beam of pulsed laser light.

In step 1102, method 1100 sets apparatus 900, FIG. 9, to an initial configuration. In one example of step 1102, translational stage 908 is set to provide an initial time delay of t, half-wave plate 914 is set to an initial angle φ and thick SHG crystal 918 is set to an initial angle θ. In step 1104, method 1100 splits the incoming beam into two beams of substantially equal intensity. In one example of step 1104, incoming beam 952 is split into two beams 953, 954 of substantially equal intensity by first beam splitter 902. In step 1106, method 1100 delays one beam for a period t. In one example of step 1106, translational stage 908 and mirrors 904 and 906 delay beam 954 by a period t. In step 1108, method 1100 converges the beams 953, 954, split in step 1104 towards the thick SHG crystal. In one example of step 1108, second beam splitter 912 reflects beam 954 towards thick SHG crystal 918 and mirror 907 reflects beam 953 towards thick SHG crystal 918.

In step 1110, method 1100 passes the converging beams through the half-wave plate at angle φ. In one example of step 1110, beams 953 and 954 pass through half-wave plate 914 at angle φ, as controlled by first rotational stage 916.

In step 1112, method 1100 passes the beam through the SHG crystal at rotation angle θ. In one example of step 1112, beams 953 and 954 pass through thick SHG crystal 818 at angle θ, as controlled by second rotational stage 920, to form SHG beams 960 and 961. In step 1113, method 1100 filters the SHG beams through a spatial filter. In one example of step 1113, beams 960 and 961 are filtered by spatial filter 921. In step 1114, method 1100 detects the light emitted from the SHG crystal as data. In one example of step 1114, detector 922 detects SHG beam 962 and generates data. As noted above, the detector may include filtering, such as wavelength filtering, without departing from the scope hereof. In step 1116, method 1100 stores the data with reference to delay period t, half-wave plate rotation angle φ and SHG crystal rotation angle θ. In one example of step 1116, detector 922 sends the captured data to data processor 926 where the data is stored in association with the current delay period t of translational stage 908, the current rotation angle φ of first rotational stage 916 (i.e., the current rotational angle of half-wave plate 914), and the current rotation angle θ of second rotational stage 920 (i.e., the current rotational position of thick SHG crystal 918).

In step 1118, method 1100 rotates the half-wave plate 914 by angle δφ. In one example of step 1118, controller 924 controls first rotational stage 916 to rotate half-wave plate 914 by the same angle δφ. Step 1120 is a decision step. If, in step 1120, method 1100 determines that the half-wave plate has completed a desired range (e.g., 90°) of rotation, method 1100 continues on to step 1122, otherwise method 1100 repeats steps 1104 through 1118 until half-wave plate has completed the desired range of rotation. Note, only 90° of rotation of the half-wave plate is required, since further rotation could result in unnecessary repetition. Smaller ranges may be used where specific measurements are desired to reduce the measurement time.

In step 1122, method 1100 rotates the SHG crystal by the angle δθ. In one example of step 1122, controller 924 controls second rotational stage 920 to rotate thick SHG crystal 918 by the angle δθ. Step 1124 is a decision step. If, in step 1124, method 1100 determines that the SHG crystal has completed a desired range (e.g., 180°) of rotation, method 1100 continues with step 1126; otherwise method 1100 repeats steps 1104 though 1122 until SHG crystal has completed the desired range of rotation. Note, only 180° of rotation of the crystal is required, since further rotation could result in unnecessary repetition. Smaller ranges may be used where specific measurements are desired to reduce the measurement time.

In step 1126, method 1100 increases beam delay period by δt. In one example of step 1126, controller 924 controls translational stage 908 to increase a path length of beam 954 equivalent to a delay change of δt. Step 1128 is a decision step. If, in step 1128, method 1100 determines that the desired beam delay period range has been completed, method 1100 continues with step 1130; otherwise method 1100 repeats steps 1104 though 1126 until the desired beam delay period range has been completed.

In step 1130, method 1100 processes the stored results of step 1116 to determine amplitude and phase versus frequency of the incoming beam of pulsed laser light. In one example of step 1130, data processor 926 processes stored data to determine amplitude and phase versus frequency of the incoming beam 952 of pulsed laser light.

The ordering of steps within method 1100 may change without departing from the scope hereof. For example, the order in which method 1100 adjusts (a) the angle of the half-wave plate, (b) the angle of the SHG crystal, and (c) the delay period of the split beam may be changed as appropriate for ordering of the resulting data, as will be appreciated by one of ordinary skill in the art after reading and comprehending the present application.

Figure 12:
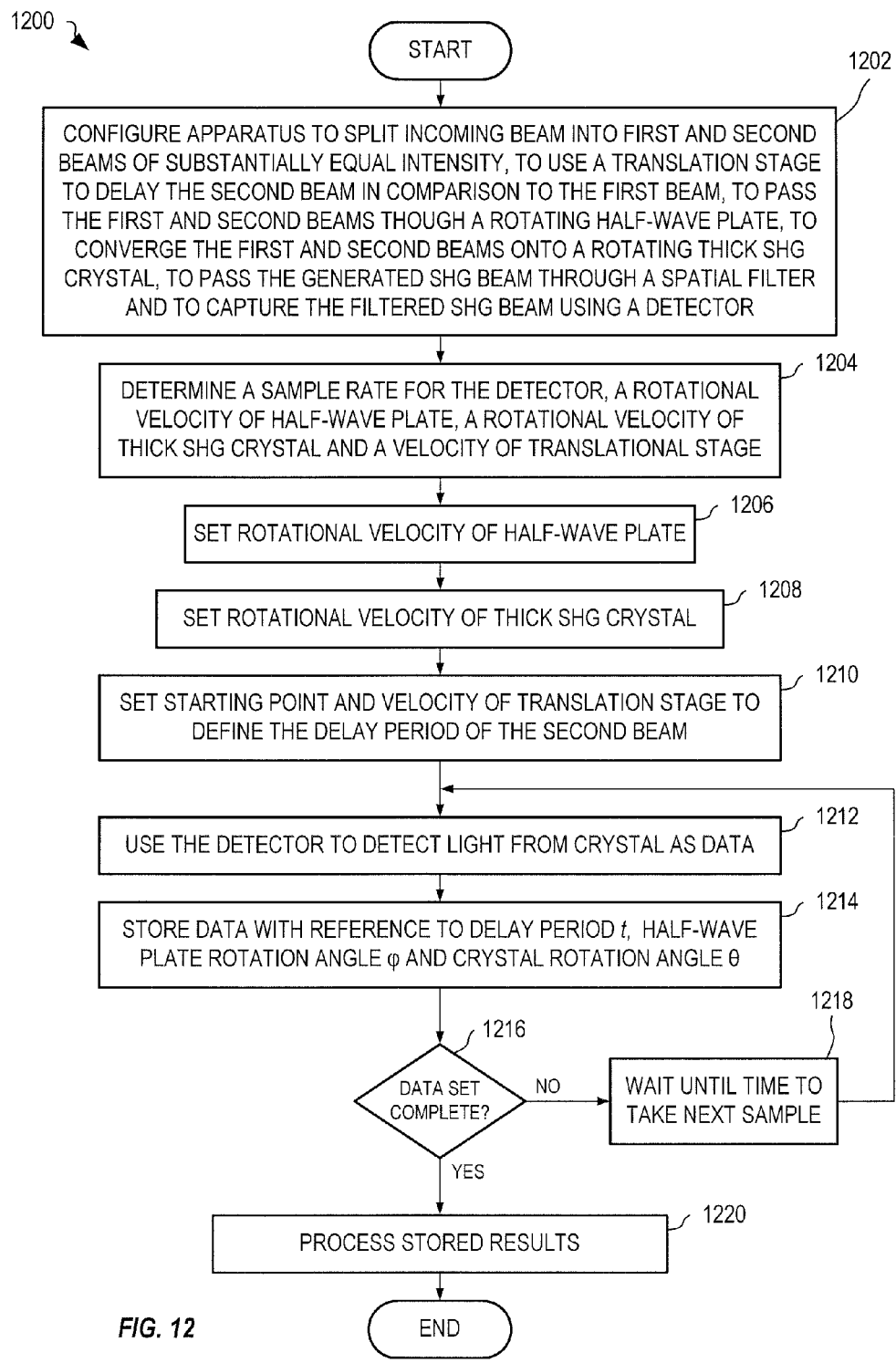
FIG. 12 is a flowchart illustrating one exemplary RotaryFROG method for determining amplitude and phase versus frequency of an incoming beam of pulsed laser light.

FIG. 12 is a flowchart illustrating one exemplary Rotary-FROG method 1200 for determining amplitude and phase versus frequency of an incoming beam of pulsed laser light using continuous movement of certain optical elements.

In step 1202, method 1200 configures apparatus (a) to split the incoming beam into a first and a second beam of substantially equal intensity, (b) to use a translation stage to delay the second beam in comparison to the first beam, (c) to pass the first and second beams though a rotating half-wave plate, (d) to converge the first and second beams towards a rotating thick SHG crystal, (e) to pass the generated SHG beam through a spatial filter and (0 to capture the filtered SHG beam using a detector. In one example of step 1202, apparatus 900 is configured such that first beam splitter 902 splits incoming beam 952 into two beams 953, 954 of substantially equal intensity. Beam 954 is reflected by mirrors 904 and 906 and is then reflected to converge upon thick SHG crystal 918 at second beam splitter 912, and beam 953 is reflected by mirrors 905 and 907 to converge onto thick SHG crystal 918. Beams 953 and 954 then pass through half-wave plate 914 and are incident upon thick SHG crystal 918, such that thick SHG crystal 918 generates SHG beams 960 and 961. SHG beams 960 and 961 are filtered and/or recombined by spatial filter 921 to leave SHG beam 962 that is then detected by detector 922 to produce data that is sent to data processor 926 for storing and/or processing.

In step 1204, method 1200 determines the sample rate for the detector, the rotational velocity of the half-wave plate, the rotational velocity of the thick SHG crystal and the velocity of the translation stage. In one example of step 1204, the rotational rate of first rotational stage 916, the rotational rate of second rotational stage 920 and velocity of translational stage 908 are determined to generate a desired set of results based upon a defined sample rate of detector 922. As appreciated by one of ordinary skill in the art, after reading and fully comprehending the present disclosure, the rotational velocities and translation velocity may be selected to provide the appropriate ordering of result data.

In step 1206, method 1200 sets the rotational velocity of the half-wave plate. In one example of step 1206, controller 924 operates first rotational stage 916 such that half-wave plate 914 has a constant rotational rate. In step 1208, method 1200 sets the rotational velocity of the thick SHG crystal. In one example of step 1208, controller 924 operates second rotational stage 920 such that thick SHG crystal 918 has a constant rotational velocity. In step 1210, method 1200 sets the translation stage to an initial position and to have a constant velocity to define the delay period of the second beam 954. In one example of step 1210, controller 924 operates translational stage 908 to move to an initial position and then to move with a constant velocity.

In step 1212, method 1200 uses the detector to detect light from the thick SHG crystal as data. In one example of step 1212, detector 922 detects light of SHG beam 962 after SHG beam 962 passes through spatial filter 921 (as separated beams 960, 961) and generates data. As noted above, the detector may also include filtering, such as wavelength filtering, without departing from the scope hereof. In step 1214, method 1200 stores the data with reference to delay period t, half-wave plate rotation angle φ and thick SHG crystal rotation angle θ. In one example of step 1214, at the time of sampling of detector 922, controller 924 measures position of translational stage 908 to determine delay t, angle φ of half-wave plate 914 based upon first rotational stage 916, and angle θ of thick SHG crystal 918 based upon second rotational stage 920.

Step 1216 is a decision. If, in step 1216, method 1200 determines that the data set is complete, method 1200 continues with step 1220; otherwise method 1200 continues with step 1218. In step 1218, method 1200 waits until it is time to take the next sample, based upon the determined sample rate of step 1204. Method 1200 then continues with step 1212. Steps 1212 through 1218 repeat until the sample data set is complete.

In step 1220, method 1200 processes the stored results. In one example of step 1220, data processor 926 processes stored data to determine amplitude and phase versus frequency of the incoming beam 952 of pulsed laser light.

The ordering of steps within method 1200 may change without departing from the scope hereof. For example, the order in which method 1200 sets the rotational velocities and translation stage velocity may be changed, as will be appreciated by one of ordinary skill in the art after reading and comprehending the present application. Further, as mentioned above, the rotational velocities and translation velocity may be selected together with the detector sample rate to generate the appropriate ordering of the result set. Other mechanisms for determining the angular position of half-wave plate 914, thick SHG crystal 918, and translational stage 908 may be used without departing from the scope hereof. For example, controller 924 may determine angular position of one or both of rotational stages 916 and 920 based upon the configured rotation velocity of each stage and a synchronization pulse from each stage. In one embodiment, one or more of the translation and rotational stages are stepper based and stepper sequences are determined in step 1204 of method 1200, wherein the timing, and angular positions are determined from the stepper sequences.

Figure 13:
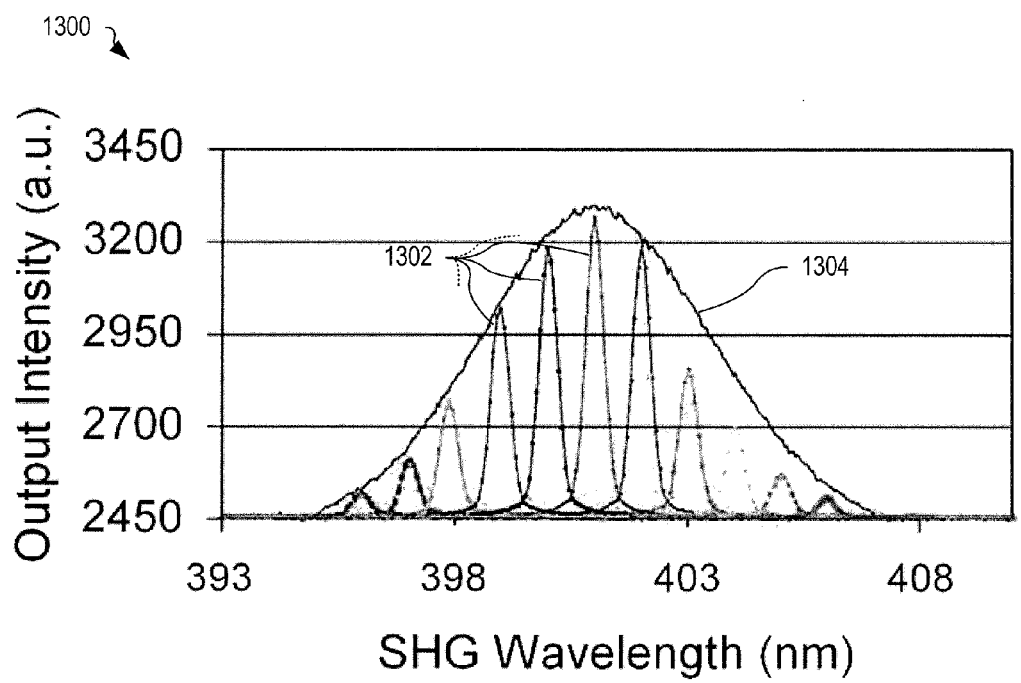
FIG. 13 shows exemplary second harmonic spectrum of a broadband pulse obtained by compiling narrowband spectra from a thick crystal using a RotaryFROG method.

FIG. 13 shows exemplary second harmonic spectrum 1300 of a broadband pulse obtained by compiling narrowband spectra 1302 from a thick crystal using a RotaryFROG method (e.g., method 1200, FIG. 12) and apparatus (e.g., apparatus 800, FIG. 8 and apparatus 900, FIG. 9). The wide curve 1304 is the expected spectra, and all other curves represent spectra centered at varying wavelengths, i.e., at carrying angles of the crystal. For clarity of illustration, only selected narrowband spectra are shown. A thin rotating crystal may be thought of as being comprised of many individual crystals, each with a sinc-filtered bandwidth, centered at different phase-matching frequencies $\omega_f$ determined by the rotation angle $$|E_{thick}(2\omega)| \cong \left|\mathrm{sinc}\left(\frac{\pi(\omega - \omega_f)}{\delta\omega_f}\right)\right|\frac{L_{thick}}{L_{thin}}|E_{thin}(2\omega)|, \quad \text{Equation 9}$$

and $$\delta\omega_f = \frac{2\pi}{L}\frac{1}{\beta_{1,o}\cos(\alpha) - \beta_{1,e}} \quad \text{Equation 10}$$

is the filtered phase-matching bandwidth, where the inverse group velocities are defined as $\beta_{1,o}=[\partial k_o(\omega)]/\partial\omega$ and $\beta_{1,e}=[\partial k_e(\omega)]/\partial\omega$. The angle α is the angle between the two incoming beams for a non-collinear geometry. It is understood that $|E_{thin}(2\omega)|$ means the SH signal from a crystal that is sufficiently thin so that $L_{thin} \ll \pi/\Delta k_{max}$. The different, peaks of narrowband spectra 1302 illustrate the bandwidth (sinc function) for a selected number of different rotational angles. For beta-barium borate (BBO) this spectral filter width is $\delta\lambda_f \leq 2.73$ nm mm/L as compared with $\delta\lambda_f \leq 6.2$ nm mm/L for KDP.

The geometry associated with RotaryFROG eliminates the drawbacks of the prior art techniques by maintaining a constant angle between the propagation direction and the surface of the crystal, and maintaining the same crystal interaction length. Also, this technique uses a constant rotational rate that does not introduce a stochastic dwell time or bias for any wavelength regions, but instead any wavelength signal variations are easily and predictably calibrated for.

The rotational geometry of RotaryFROG uses a thick crystal cut such that its bandwidth of interest (i.e., the same optical axis geometry as for a thin crystal). Ignoring polarization effects initially, the RotaryFROG rotates the crystal about a rotational axis nearly collinear with the incident light, providing a constant output bandwidth unaffected by its position.

However, by introducing a small angle between the axis of rotation and the crystal's optical axis, we observe that as the position of rotation about its axis changes, so does the angle between the optical axis and the direction of the incident light. A rotation of 1° corresponds to a wavelength shift of 0.64 nm, and the spectral width is approximately 0.4 nm for the 7 mm BBO crystal used in all of exemplary measurements.

Figure 14:
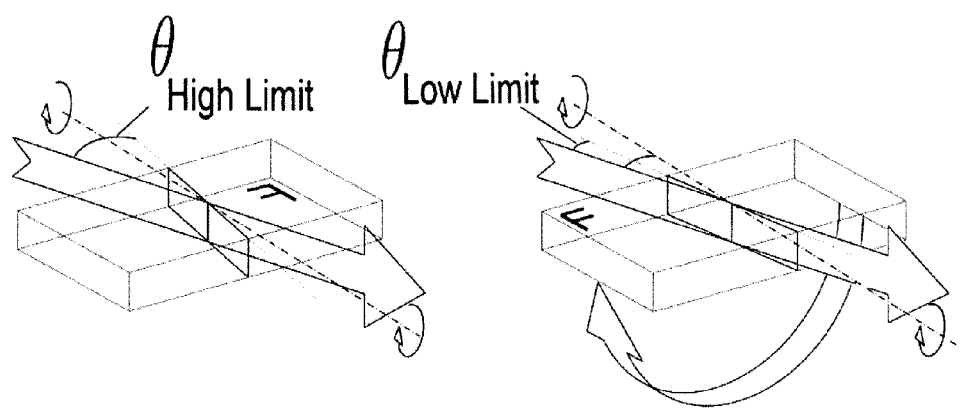
FIG. 14 illustrates a full range of phase-matching wavelengths for the RotaryFROG.

FIG. 14 illustrates the full range of phase-matching wavelengths for the RotaryFROG. In the case of the shortest wavelength (smallest angle between the incident light and the optical axis), the optical axis is located between the rotational axis and the path of the incident light. After a 180° rotation, the longest phase-matching wavelength of the crystal is achieved, and the rotational axis is now located between the optical axis and the direction of propagation. These extreme phase-matching positions are achieved only once over a 360° rotation of the crystal; however, all other values are seen twice, once between 0° to 180° and again in reverse order from 180° to 360°.

An additional design consideration for the RotaryFROG is the choice of the $\phi$ angle. For type I phase matching in a negative crystal with crystal structure 3m, such as BBO, the effective nonlinear coefficient may be written as $$d_{\textit{eff}} = d_{31} \sin\theta - d_{22} \cos\theta \sin 3\phi. \quad \text{Equation 11}$$

For most applications a choice of $\phi=0°$ is the default set by the manufacturers. In the case of RotaryFROG it is possible to improve the SH efficiency by up to 10% for either the 0° to 180° or the 180° to 360° portion of rotation by a judicious choice of $\phi$. Note that the SH efficiency for the half that is not optimized will decrease by approximately 10% compared with the crystal cut for $\phi=0°$.

To obtain efficient SHG, the incident light on the crystal must have the necessary polarization orientation. Rotating a crystal through a full cycle with the expressed geometry, phase matching occurs only at two positions; therefore it is necessary to control the orientation of the polarized light prior to its arrival at the crystal. This control is achieved using an ultrafast zeroth-order half-wave plate, mounted in a second rotational stage, capable of tracking the required polarization of the SHG crystal.

The presence of the rotating half-wave plate provides the user with the added flexibility of determining the full polarization state of the ultrafast laser pulse. This instrument may therefore be used in two modes: emulation of a standard FROG instrument where a single polarization (typically the peak polarization) is considered, and providing a FROG trace at various polarization orientations.

In this latter mode, polarization may be considered as an added third dimension to the existing parameters of time delay and wavelength.

Of course polarization measurements can be made with standard FROG instruments simply by varying the incoming polarization of the experimental beam entering the instrument; however, with the RotaryFROG setup these data can be collected during the same experiment.

The rotating half-wave plate and SHG crystal geometry can be used in both collinear and noncollinear setups, as shown in FIGS. 8 and 9, respectively. These setups are very stable, and after initial calibration regular recalibrations are not necessary.

Figure 15:
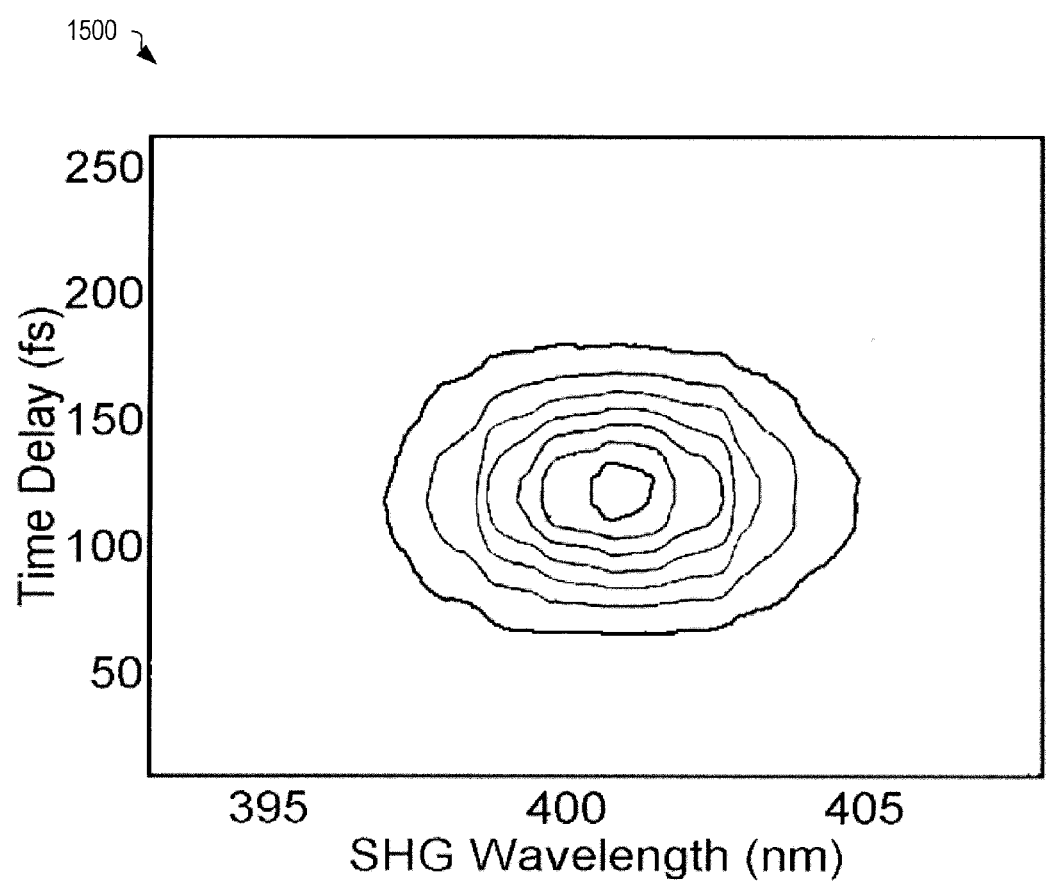
FIG. 15 shows a trace obtained by a noncollinear RotaryFROG geometry.

In addition to the results shown in FIG. 13 a further measurement Was performed to prove the principal workings of the RotaryFROG. The measurement was performed with a 96 fs pulse from a SPECTRA-PHYSICS MAITAI ® laser. The bandwidth of the laser pulse was 12 nm. FIG. 15 shows a trace 1500 obtained by a noncollinear RotaryFROG geometry with a 7-mm-thick crystal.

The phase-retrieval software error for this measurement was 0.03%. Since the walk-off angle for BBO is relatively large (67.8 mrad), the beam was collimated with a $1/e^2$ beam radius of $\approx 1$ mm. The results from the RotaryFROG measurement were verified by comparison with a conventional 100 μm crystal FROG measurement.

Changes may be made in the above methods and systems without departing from the scope hereof. For example, in connection with FIG. 8, other geometries are possible to optimize control. Specifically, rotation and orientation of crystal 818 and polarization unit 814, with respect to beams 856, 858 may be used advantageously. Interpretation of the data therefrom be accomplished with software. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for determining amplitude and phase versus frequency of an incoming beam of pulsed laser light, comprising the steps of:
    setting an apparatus to an initial configuration;
    splitting the incoming beam into two beams of substantially equal intensity;
    delaying one of the two split beams for a delay period t;
    recombining the two split beams to form a recombined beam;
    shining the recombined beam onto a thick SHG crystal at rotation angle θ;
    detecting light emitted from the thick SHG crystal as data;
    storing the data with reference to the delay period t and the angle θ;
    rotating the thick SHG crystal by an angle δθ;
    repeating the steps of splitting, delaying, recombining, shining, detecting, storing, and rotating until the thick SHG crystal has completed 360° of rotation;
    increasing the delay period t by δt;
    repeating the steps of splitting, delaying, recombining, shining, detecting, storing, rotating, repeating and increasing until a selected beam delay period range has been completed; and
    processing the stored data to determine amplitude and phase versus frequency of the incoming beam of pulsed laser light.

2. The method of claim 1, further comprising the steps of:
    passing the recombined beam through a half-wave plate at angle φ prior to the step of shining the recombined beam onto the thick SHG crystal;
    storing the data with reference to the delay period t, the angle φ, and the angle θ;
    rotating the half-wave plate by angle δφ; and
    repeating the steps of splitting, delaying, recombining, passing, shining, detecting, storing and rotating until the half-wave plate has completed 360° of rotation.

3. A system for determining amplitude and phase versus frequency of an incoming beam of pulsed laser light, comprising:
    a first beam splitter for splitting the incoming beam into first and second beams having substantially equal intensity;

a translation time delay stage for delaying one of the first and second beams;

a second beam splitter for recombining the first and second beams into a combined beam;

a second-harmonic generation crystal mounted in a rotational stage, the second-harmonic generation crystal generating second-harmonic light from the combined beam;

a detector for detecting the second harmonic light as data; and a controller for (a) controlling the translation time delay stage and the second-harmonic generation crystal rotational stage, (b) recording the data in association with positions of the translation time delay stage and the second-harmonic generation crystal rotational stage, and (c) processing the data and positions to determine the amplitude and phase versus frequency of the incoming beam of pulsed laser light;

wherein the second-harmonic generation crystal rotational stage is controlled to rotate through 360°.

4. The system of claim 3, further comprising:

a half-wave plate mounted in a rotational stage and positioned between the second beam splitter and the second harmonic generation crystal, the half-wave plate polarizing the combined beam before the combined beam enters the second-harmonic generation crystal;

wherein the controller further controls the rotation of the half-wave plate with respect to the rotation of the second-harmonic generation crystal and further records the position of the half-wave plate in association with the data, and processes the data and positions to determine the amplitude and phase versus frequency of the incoming beam of pulsed laser light.

5. A method for determining amplitude and phase versus frequency of an incoming beam of pulsed laser light, comprising:

configuring an apparatus to split the incoming beam into a first and a second beam of substantially equal intensity, to use a translation stage to delay the second beam in comparison to the first beam, to pass the first and second beams though a rotating half-wave plate, to converge the first and second beams onto a rotating thick SHG crystal such that an SHG beam is generated by the crystal, to pass the generated SHG beam through a spatial filter and to capture the filtered SHG beam using a detector;

determining a detector sample rate, a half-wave plate rotational velocity, a thick SHG crystal rotational velocity, and a translational stage velocity;

rotating the half-wave plate at the half-wave plate rotational velocity;

rotating the thick SHG crystal at the thick SHG crystal rotational velocity;

initializing the translational stage and moving the translational stage at the translational stage velocity;

detecting light from the thick SHG crystal as data;

storing the data in a data set with a delay period t defined by a position of the translational stage, an angle $\phi$ based upon a rotational position of the half-wave plate, and an angle $\theta$ based upon a rotational position of the thick SHG crystal;

repeating, at the detector sample rate, the steps of detecting and storing until a set of data is complete; and processing the data set to determine the amplitude and phase versus frequency of the incoming beam of pulsed laser light.

6. A RotaryFROG apparatus for determining amplitude and phase versus frequency of an incoming beam of pulsed laser light, comprising:

a first beam splitter for splitting the incoming beam into first and second beams having substantially equal intensity;

a translation time delay stage for delaying one of the first and second beams;

a second beam splitter for recombining the first and second beams into a combined beam;

a half-wave plate mounted in a rotational stage and rotating at a half-wave plate rotational velocity, the half-wave plate controlling an orientation of the polarized light of the combined beam;

a second-harmonic generation crystal mounted in a rotational stage and rotating at a constant SHG crystal rotational velocity, the second-harmonic crystal generating second-harmonic light from the combined beam;

a detector for detecting the second-harmonic light as data; and a processor for controlling rotational positions of the half-wave plate and the second-harmonic generation crystal and for storing the data in association with rotational positions of the half-wave plate and the second-harmonic generation crystal;

wherein the processor processes the data and the rotational positions to determine the amplitude and phase versus frequency of the incoming beam of pulsed laser light.

7. A RotaryFROG apparatus for determining amplitude and phase versus frequency of an incoming beam of pulsed laser light, comprising:

optical geometry for splitting the incoming beam into first and second beams having substantially equal intensity, for delaying one of the first and second beams, and for recombining the first and second beams into a combined beam;

a half-wave plate mounted in a rotational stage and rotating at a half-wave plate rotational velocity, the half-wave plate controlling an orientation of the polarized light of the combined beam;

a second-harmonic generation crystal mounted in a rotational stage and rotating at a constant SHG crystal rotational velocity, the second-harmonic crystal generating second-harmonic light from the combined beam;

a detector for detecting the second-harmonic light as data; and a processor for controlling rotational positions of the half-wave plate and the second-harmonic generation crystal and for storing the data in association with rotational positions of the half-wave plate and the second-harmonic generation crystal;

wherein the processor processes the data and the rotational positions to determine the amplitude and phase versus frequency of the incoming beam of pulsed laser light.

\* \* \* \* \*

UNITED STATES PATENT AND TRADEMARK OFFICE
CERTIFICATE OF CORRECTION

PATENT NO.       : 8,379,215 B2
APPLICATION NO.  : 12/904936
DATED            : February 19, 2013
INVENTOR(S)      : Armin T. Ellis and Ulf Osterberg It is certified that error appears in the above-identified patent and that said Letters Patent is hereby corrected as shown below:

In the Specification

Column 1, line 24: "phase versus" should read --phase, versus--

Column 1, line 31: "described by," should read --described by--

Column 1, line 41: "mechanisms, that" should read --mechanisms that--

Column 1, line 59: "an X$^{(2)}$)" should read --an X$^{(2)}$--

Column 2, line 15: "crystal varies" should read --crystal varies,--

Column 6, line 8: "$E(\omega)=|\int_{-\infty}^{\infty} E_{recomb} e^{j\omega t} dt|^2$" should read -- $E(\omega)=\left|\int_{-\infty}^{\infty} E_{recomb} e^{i\omega t} dt\right|^2$ --

Column 7, line 18: "$\Delta k = k1+k2-k3 = 2\omega n^{(\omega)}/c - \omega n^{(2\omega)}/c = 2\omega/c[n^{(2\omega)} - n^{(\omega)}]$," should read -- $\Delta k = k1+ k2 -k3 = 2 \omega n^{(\omega)}/c - \omega n^{(2\omega)}/c = 2\omega/c[n^{(2\omega)} - n^{(\omega)}]$, --

Column 7, line 30: "$\delta k=0$" should read --$\Delta k = 0$--

Column 7, line 34: "$2\omega, n^{(\omega)}$" should read --$2\omega, n^{(2\omega)}$--

Column 7, line 53: "$n_e^{2\omega}$ and a circle $n_o^\omega$" should read -- $n_e^{2\omega}$ and a circle $n_0^\omega$ --

Column 8, line 24: "$d_{eff}^{type-I}=(d_{11}\cos 3\phi - d_{22}\sin 3\phi)\cos\theta + d_{31}\sin\theta$" should read -- $d_{eff}^{type-I} = (d_{11}\cos 3\phi - d_{22}\sin 3\phi)\cos\theta + d_{31}\sin\theta$ --

Column 10, line 51: "1022," should read --1022;--

Signed and Sealed this
Tenth Day of December, 2013

Margaret A. Focarino
*Commissioner for Patents of the United States Patent and Trademark Office*

Column 10, line 64: "onto step" should read --on to step--

Column 12, line 12: "1122," should read --1122;--

Column 12, line 66: "(0" should read --(f)--

Column 14, line 48: "different, peaks" should read --different peaks--

Column 15, line 22: "phase matching" should read --phase-matching--

Column 15, line 26: "$d_{eff}=d_{31} \sin \theta - d_{22} \cos \theta \sin 3\phi.$" should read --$d_{eff} = d_{31} \sin \vartheta - d_{22} \cos \vartheta \sin 3\varphi.$--

Column 15, line 38: "phase matching occurs only at two positions; therefore it is" should read --phase-matching occurs only at two positions; therefore, it is--

Column 15, line 54: "of course polarization" should read --of course, polarization--

Column 15, line 62: "stable, and after initial calibration regular" should read --stable and, after initial calibration, regular--

Column 15, line 64: "in FIG. 13 a," should read --in FIG. 13, a--

Column 15, line 65: "Was performed" should read --was performed--

Column 16, line 16: "therefrom be" should read --therefrom may be--

In the Claims

Claim 3, line 9: "second harmonic" should read --second-harmonic--

Claim 4, lines 23 to 24: "second harmonic" should read --second-harmonic--

UNITED STATES PATENT AND TRADEMARK OFFICE
CERTIFICATE OF CORRECTION

PATENT NO. : 8,379,215 B2                                                                    Page 1 of 2
APPLICATION NO. : 12/904936
DATED : February 19, 2013
INVENTOR(S) : Armin T. Ellis and Ulf Osterberg It is certified that error appears in the above-identified patent and that said Letters Patent is hereby corrected as shown below:

In the Specification

Column 1, line 24: "phase versus" should read --phase, versus--

Column 1, line 31: "described by," should read --described by--

Column 1, line 41: "mechanisms, that" should read --mechanisms that--

Column 1, line 59: "an X$^{(2)}$)" should read --an X$^{(2)}$--

Column 2, line 15: "crystal varies" should read --crystal varies,--

Column 6, line 8: "$E(\omega)=|\int_{-\infty}^{\infty} E_{recomb} e^{i\omega t} dt|^2$," should read -- $E(\omega) = \left|\int_{-\infty}^{\infty} E_{recomb} e^{i\omega t} dt\right|^2$ --

Column 7, line 18: "$\Delta k = k1 + k2 - k3 = 2\omega n^{(\omega)}/c - \omega n^{(2\omega)}/c = 2\omega/c[n^{(2\omega)} - n^{(\omega)}]$,"

should read -- $\Delta k = k1 + k2 - k3 = 2\omega n^{(\omega)}/c - \omega n^{(2\omega)}/c = 2\omega/c[n^{(2\omega)} - n^{(\omega)}]$, --

Column 7, line 30: "$\delta k = 0$" should read --$\Delta k = 0$--

Column 7, line 34: "2$\omega$, n$^{(\omega)}$" should read --2$\omega$, n$^{(2\omega)}$--

Column 7, line 53: "n$_e^{2\omega}$ and a circle n$_o^{\omega}$" should read -- $n_e^{2\omega}$ and a circle $n_0^{\omega}$ --

Column 8, line 24: "$d_{eff}^{type-I}=(d_{11}\cos 3\phi - d_{22}\sin 3\phi)\cos\theta + d_{31}\sin\theta$,"

should read -- $d_{eff}^{type-I} = (d_{11}\cos 3\phi - d_{22}\sin 3\phi)\cos\theta + d_{31}\sin\theta$ --

This certificate supersedes the Certificate of Correction issued December 10, 2013.

Signed and Sealed this
Fourth Day of February, 2014

Michelle K. Lee
*Deputy Director of the United States Patent and Trademark Office*

CERTIFICATE OF CORRECTION (continued)

Column 10, line 51: "1022," should read --1022;--

Column 10, line 64: "onto step" should read --on to step--

Column 12, line 12: "1122," should read --1122;--

Column 12, line 66: "(0" should read --(f)--

Column 14, line 48: "different, peaks" should read --different peaks--

Column 15, line 22: "phase matching" should read --phase-matching--

Column 15, line 26: "$d_{eff}=d_{31} \sin \theta - d_{22} \cos \theta \sin 3\phi.$" should read --$d_{eff} = d_{31} \sin \vartheta - d_{22} \cos \vartheta \sin 3\varphi.$--

Column 15, line 38: "phase matching occurs only at two positions; therefore it is" should read --phase-matching occurs only at two positions; therefore, it is--

Column 15, line 54: "of course polarization" should read --of course, polarization--

Column 15, line 62: "stable, and after initial calibration regular" should read --stable and, after initial calibration, regular--

Column 15, line 64: "in FIG. 13 a," should read --in FIG. 13, a--

Column 15, line 65: "Was performed" should read --was performed--

Column 16, line 16: "therefrom be" should read --therefrom may be--

In the Claims

Column 17, Claim 3, line 9: "second harmonic" should read --second-harmonic--

Column 17, Claim 4, lines 23 to 24: "second harmonic" should read --second-harmonic--